United States Patent
Baek et al.

(10) Patent No.: US 10,212,726 B2
(45) Date of Patent: Feb. 19, 2019

(54) METHOD AND APPARATUS FOR TRANSMITTING UPLINK SIGNAL IN MOBILE COMMUNICATION SYSTEM OF UNLICENSED BAND

(71) Applicant: ELECTRONICS AND TELECOMMUNICATIONS RESEARCH INSTITUTE, Daejeon (KR)

(72) Inventors: Seung-Kwon Baek, Daejeon (KR); Young Jo Ko, Daejeon (KR); Eunkyung Kim, Daejeon (KR); Chanho Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 121 days.

(21) Appl. No.: 15/331,371

(22) Filed: Oct. 21, 2016

(65) Prior Publication Data
US 2017/0118766 A1    Apr. 27, 2017

(30) Foreign Application Priority Data

Oct. 23, 2015 (KR) .................. 10-2015-0148363
Aug. 25, 2016 (KR) .................. 10-2016-0108532

(51) Int. Cl.
*H04W 72/12* (2009.01)
*H04L 1/18* (2006.01)

(52) U.S. Cl.
CPC ....... *H04W 72/1268* (2013.01); *H04L 1/1887* (2013.01); *H04L 1/1816* (2013.01); *H04L 1/1877* (2013.01); *H04W 72/1252* (2013.01)

(58) Field of Classification Search
CPC ...................................................... H04L 12/50
(Continued)

(56) References Cited

U.S. PATENT DOCUMENTS

2015/0201431 A1    7/2015 Um et al.
2015/0256303 A1    9/2015 Belghoul et al.
(Continued)

OTHER PUBLICATIONS

3rd Generation Partnership Project, Technical Specification Group Radio Access Network, "Study on Licensed-Assisted Access to Unlicensed Spectrum," 3GPP TR 36.889, Release 13, V1.0.1, pp. 1-87, Annex B1-B3, Jun. 2015.

*Primary Examiner* — Dang T Ton
(74) *Attorney, Agent, or Firm* — Rabin & Berdo, P.C.

(57) ABSTRACT

Disclosed herein is a method for transmitting, by a terminal, an uplink signal using a first cell type representing a cell using a licensed band frequency and a second cell type representing a cell using an unlicensed band frequency. The terminal configures at least one first radio bearer (RB) being able to use a radio resource for the first cell type and a radio resource for the second cell type for an uplink transmission. The terminal configures at least one second RB being able to use a radio resource for the first cell type for an uplink transmission. The terminal includes at least one first logical channel corresponding to the at least one first RB in a first logical channel group, and the terminal includes at least one second logical channel corresponding to the at least one second RB in a second logical channel group.

20 Claims, 8 Drawing Sheets

(58) Field of Classification Search
USPC .......................................................... 370/260
See application file for complete search history.

(56) References Cited

U.S. PATENT DOCUMENTS

| | | | |
|---|---|---|---|
| 2015/0256305 A1* | 9/2015 | Yerramalli | H04W 76/38 370/311 |
| 2015/0305041 A1 | 10/2015 | Kim | |
| 2016/0100407 A1* | 4/2016 | Gaal | H04W 72/0453 370/329 |
| 2016/0227540 A1* | 8/2016 | Chen | H04L 5/001 |
| 2017/0353819 A1* | 12/2017 | Yin | H04L 47/30 |

* cited by examiner

FIG. 5

```
Mac-MainConfig::=  SEQUENCE {
    ul-SCH-Config  SEQUENCE {
        maxHARQ-Tx      ENUMERATED {
                            n1, n2, n3, n4, n5, n6, n7, n8,
                            n10, n12, n16, n20, n24, n28,
                            spare2, spare1}    OPTIONAL,    --Need ON maxHARQ-Tx-LAA  ENUMERATED {
                            n1, n2, n3, n4, n5, n6, n7, n8,
                            n10, n12, n16, n20, n24, n28,
                            spare2, spare1}    OPTIONAL,    --Need ON
        ......
    }
    ......
```

METHOD AND APPARATUS FOR TRANSMITTING UPLINK SIGNAL IN MOBILE COMMUNICATION SYSTEM OF UNLICENSED BAND

CROSS-REFERENCE TO RELATED APPLICATION

This application claims priority to and the benefit of Korean Patent Application Nos. 10-2015-0148363 and 10-2016-0108532 filed in the Korean Intellectual Property Office on Oct. 23, 2015 and Aug. 25, 2016, the entire contents of which are incorporated herein by reference.

BACKGROUND OF THE INVENTION

(a) Field of the Invention

The present invention relates to a method and an apparatus for transmitting an uplink signal in a mobile communication system (or cellular system) of an unlicensed band.

(b) Description of the Related Art

When carrier aggregation is provided to a terminal through a cell of a licensed band, a frequency used for a transmission belongs to a common carrier, and therefore a wireless device need not select a cell in consideration of traffic characteristics and transmit traffic through the selected cell. However, when the CA is provided to the terminal through a licensed assisted access (LAA) cell using an unlicensed band, a delay required for a transmission may be increased due to listen before talk (LBT), and therefore a signaling message used for service traffic sensitive to the delay or a signaling message used for a protocol procedure is preferably transmitted through the cell of the licensed band.

When the wireless device performs the transmission in consideration of characteristics of data and characteristics of the cell, the transmission needs to be divided into a downlink transmission and an uplink transmission according to a transmission direction. In detail, the downlink transmission may be processed in consideration of characteristics of data that a scheduler of a base station will transmit and characteristics of the cell, which may be implemented by a base station. In contrast, the uplink transmission needs to be processed in consideration of the characteristics of the data that the terminal will transmit and the characteristics of the cell and therefore an operation method therefor needs to be supported in a standard aspect.

For an uplink data transmission in the long term evolution (LTE), a logical connection like a configuration of a radio bearer (RB) and a logical channel (LC) is established and then an uplink radio resource request and uplink radio resource allocation procedure need to be performed. However, in the LTE standard, buffer status reporting (BSR) for uplink (UL) radio resource allocation (UL grant) is formed in a logical channel group (LCG) unit and an uplink radio resource is allocated in a terminal unit. The uplink radio resource allocated in the terminal unit generates a medium access control (MAC) packet data unit (PDU) through a prioritization procedure of configured logical channels and transmits the generated MAC PDU to an uplink through a transport channel.

When the above-mentioned uplink transmission procedure is performed, in the existing Rel-12 CA, all component carriers included in the CA use a licensed band frequency and therefore characteristics between the component carriers are the same. In contrast, in the LAA, the component carriers of the unlicensed band included in the CA and the component carriers of the licensed band have different characteristics. For example, a channel access and an uplink transmission through the LBT are performed in the component carrier of the unlicensed band, and therefore transmission uncertainty and a transmission delay are highly likely to be increased. Therefore, when the uplink signal is transmitted in consideration of characteristics of the above-mentioned unlicensed band cell in the LAA, a method for securing a quality of service (QoS) of traffic is required.

SUMMARY OF THE INVENTION

The present invention has been made in an effort to provide a method and an apparatus for transmitting an uplink signal in a mobile communication system having advantages of securing QoS of traffic in LAA.

An exemplary embodiment of the present invention provides a method for transmitting, by a terminal, an uplink signal using a first cell type representing a cell using a licensed band frequency and a second cell type representing a cell using an unlicensed band frequency. The method includes: configuring at least one first radio bearer (RB) being able to use a radio resource for the first cell type and a radio resource for the second cell type for an uplink transmission; configuring at least one second RB being able to use a radio resource for the first cell type for an uplink transmission; including at least one first logical channel corresponding to the at least one first RB in a first logical channel group; and including at least one second logical channel corresponding to the at least one second RB in a second logical channel group.

A secondary cell (SCell) may be configured as one of the first cell type and the second cell type based on a frequency used by the SCell operated using carrier aggregation (CA) among the licensed band frequency and the unlicensed band frequency.

The at least one second logical channel may use a radio resource of the first cell type of a cell group for an uplink transmission.

The at least one first logical channel may use a radio resource of the first cell type of a cell group and a radio resource of the second cell type of a cell group for an uplink transmission.

The at least one second logical channel may use radio resources of a first cell type of a cell corresponding to the second logical channel group for an uplink transmission, and The at least one first logical channel may use the radio resources of the first cell type of a cell and the second cell type of a cell corresponding to the first logical channel group for an uplink transmission.

The method may further include trying to transmit medium access control (MAC) control element (CE) based on at least one of the first logical channel group and the second logical channel group using a first uplink grant allocated to the second cell type of a cell; and trying to retransmit the MAC CE using a second uplink grant allocated to the first cell type of a cell when the transmission of the MAC CE fails.

The trying of the transmission of the MAC CE may include: receiving configuration of a first period for the transmission of the MAC CE from a base station; and performing the transmission of the MAC CE using the first uplink grant for the first period.

The trying of the retransmission of the MAC CE may include: performing the retransmission of the MAC CE using the second uplink grant when the transmission of the MAC CE performed for the first period fails.

The method may further include: measuring a channel congestion used in the second cell type of a cell; and trying to transmit medium access control (MAC) control element (CE) based on at least one of the first logical channel group and the second logical channel group using a first uplink grant allocated to the second cell type of a cell when the channel congestion is smaller than a threshold value.

The measuring of the channel congestion may include: calculating the channel congestion that is a ratio of the number of uplink transmission successes to the number of uplink grants allocated within an observation window for measurement of the channel congestion.

The measuring of the channel congestion may include: calculating the channel congestion within an observation window configured for measurement of the channel congestion; shifting the observation window by a predetermined value smaller than a length of the observation window; and calculating the channel congestion within the shifted observation window.

The measuring of the channel congestion may include: calculating the channel congestion within a first observation window configured for measurement of the channel congestion; and calculating the channel congestion within a second observation window configured not to overlap the first observation window.

The method may further include: receiving allocation of a first radio resource from a base station using at least one of the first cell type of a cell and the second cell type of a cell; and transmitting a medium access control (MAC) control element (CE) based on at least one of the first channel group and the second channel group to the base station through the first radio resource to report a buffer status for an uplink transmission to the base station.

The method may further include: receiving allocation of a radio resource of the first cell type of a cell for the second logical channel group, when the second logical channel group includes a logical channel for a signaling radio bearer (SRB) or real-time traffic; and receiving allocation of a radio resource of the second cell type of a cell for the first logical channel group, when the first logical channel group includes a logical channel for non real-time traffic.

Another exemplary embodiment of the present invention provides a method for transmitting, by a terminal, an uplink signal using a first cell type representing a cell using a licensed band frequency and a second cell type representing a cell using an unlicensed band frequency. The method may include: receiving allocation of a first uplink radio resource for an uplink transmission from a base station; allocating a radio resource as much as a priority bit rate (PBR) among the first uplink radio resource to at least one first logical channel, respectively, corresponding to the first cell type in descending priority, when a first uplink grant among the first uplink grant of the first cell type and a second uplink grant of the second cell type is received; and, when the first uplink radio resource remains, allocating a radio resource as much as the PRB among the remaining uplink radio resources to at least one second logical channel, respectively, corresponding to the second cell type in descending priority.

The allocating of the radio resource to the at least one second logical channel, respectively, may include: when the remaining radio resources other than the radio resource allocated to the at least one second logical channel among the remaining uplink radio resources are present, additionally allocating the remaining radio resources to the at least one second logical channel in descending priority.

The method may further include: allocating a radio resource as much as the PBR among the first uplink radio resource to the at least one second logical channel, respectively, in descending priority when the second uplink grant among the first uplink grant and the second uplink grant is received; and when the first uplink radio resource remains, additionally allocating the remaining radio resources to the at least one second logical channel in descending priority.

The method may use the first uplink grant prior to the second uplink grant to transmit a medium access control (MAC) control element (CE), when the first uplink grant and the second uplink grant are received.

Yet another exemplary embodiment of the present invention provides a method for transmitting, by a terminal, an uplink signal using a first cell type representing a cell using a licensed band frequency and a second cell type representing a cell using an unlicensed band frequency. The method may include: trying an uplink transmission using the second cell type of a cell; determining whether the uplink transmission succeeds; and trying the uplink retransmission using the second cell type of a cell based on at least one of a first HARQ parameter and a second HARQ parameter independently configured for the first cell type and the second cell type and representing the maximum number of hybrid automatic request (HARQ) retransmissions, when the uplink transmission fails.

The determining may include recognizing that the uplink transmission fails, based on at least one of a physical HARQ indicator channel (PHICH) transmitted by a base station and scheduling information transmitted by the base station and representing an uplink retransmission.

The method may further include: receiving allocation of a radio resource of the first cell type for a radio link control (RLC) retransmission from a base station when the number of uplink retransmission tries corresponds to the second HARQ parameter; and retransmitting a RLC packet data unit (PDU) through a radio resource for the RLC retransmission using at least one of a sequence number of an RLC PDU to be retransmitted at an RLC level and an HARQ process identifier used for the retransmission of the RLC PDU.

The method may further include: when the uplink transmission fails, trying an RLC retransmission based on at least one of a first radio link control (RLC) parameter and a second RLC parameter, which are independently configured for a first radio bearer (RB) being able to use a radio resource of the first cell type and a radio resource of the second cell type and a second RB being able to use a radio resource for the first cell type and which represent the maximum number of retransmissions.

BRIEF DESCRIPTION OF THE DRAWINGS

FIG. 5 is a diagram illustrating a method for setting (configuring) an independent maximum HARQ transmission frequency (the maximum number of HARQ transmissions) for an off-loadable cell and a non off-loadable cell, respectively, according to an exemplary embodiment of the present invention.

DETAILED DESCRIPTION OF THE EMBODIMENTS

Figure 1:
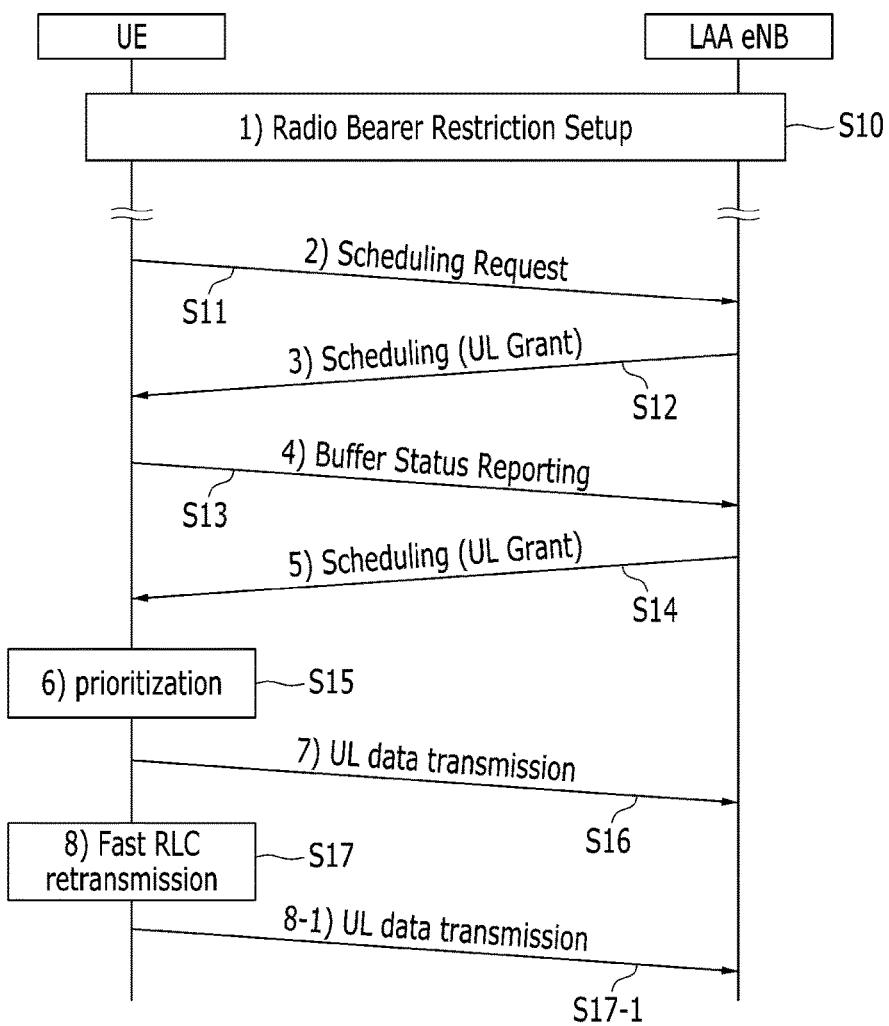
FIG. 1 is a diagram illustrating a method for transmitting an uplink signal in LAA according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the present specification, the overlapping description of the same components will be omitted.

Further, in the present specification, it is to be understood that when one component is referred to as being "connected to" or "coupled to" another element, it may be connected directly to or coupled directly to another element or be connected to or coupled to another element, having the other element intervening therebetween. On the other hand, in the present specification, it is to be understood that when one element is referred to as being "connected directly to" or "coupled directly to" another element, it may be connected to or coupled to another element without the other element intervening therebetween.

Further, terms used in the present specification are used only in order to describe specific exemplary embodiments rather than limiting the present invention.

Further, in the present specification, singular forms may be intended to include plural forms unless the context clearly indicates otherwise.

Further, in the present specification, it will be further understood that the terms "include" or "have" used in the present specification, specify the presence of features, numerals, steps, operations, components, parts mentioned in the present specification, or a combination thereof, but do not preclude the presence or addition of one or more other features, numerals, steps, operations, components, parts, or a combination thereof.

Further, in the present specification, the term "and/or" includes a combination of a plurality of relevant items or any of a plurality of relevant items. In the present specification, 'A or B' may include 'A', 'B', or 'A and B'.

Further, in the present specification, a terminal may refer to a mobile terminal, a mobile station, an advanced mobile station, a high reliability mobile station, a subscriber station, a portable subscriber station, an access terminal, user equipment, and the like and may also include all or some of the functions of the terminal, the mobile terminal, the mobile station, the advanced mobile station, the high reliability mobile station, the subscriber station, the portable subscriber station, the access terminal, the user equipment, and the like.

Further, in the present specification, a base station (BS) may refer to an advanced base station, a high reliability base station, a nodeB (NB), an evolved node B (eNodeB, eNB), an access point, a radio access station, a base transceiver station, a mobile multihop relay (MMR)-BS, a relay station serving as a base station, a high reliability relay station serving as a base station, a repeater, a macro base station, a small base station, and the like and may also include all or some of the functions of the base station, the advanced base station, the HR-BS, the nodeB, the eNodeB, the access point, the radio access station, the base transceiver station, the MMR-BS, the relay station, the high reliability relay station, the repeater, the macro base station, the small base station, and the like.

In a 3rd generation partnership project (3GPP) RAN1 and RAN2, licensed assisted access standardization that is a cellular mobile communication technology of an unlicensed band has been progressed to meet the following design targets.

One of the design targets is "A single global solution framework allowing compliance with any regional regulatory requirements". That is, one of the design targets is to derive a single solution meeting various local regulation requirements.

The other of the design targets is "Effective and fair coexistence with Wi-Fi". That is, the other of the design targets should not affect a Wi-Fi service operated in the same unlicensed band in terms of throughput and delay.

The other of the design targets is "Effective and fair coexistence among LAA networks deployed by different operators". That is, the other of the design targets is coexistence between LAA networks of different common carriers that are operated in the unlicensed band.

In the TR 36.889, required functions for the LAA based on the foregoing design target are defined as follows.

One of the required functions is "listen-before-talk (clear channel assessment)". A listen-before-talk (LBT) procedure means that a wireless device (or communication node) performs clear channel assessment (CCA) and then accesses a shared channel of the unlicensed band. The CCA is basically performed by energy detection and a channel sensing function is required for a fair operation between other wireless devices of the unlicensed band.

The other of the required functions is "discontinuous transmission on a carrier with limited maximum transmission duration". A length of maximum transmission burst in the unlicensed band is defined as regulation and a transmission considering the same is required.

The other of the required functions is "DFS (dynamic frequency selection) for radar avoidance in certain bands/regions". A radar system may be used in a specific frequency band and a DFS (for example, channel reselection, avoiding co-channel operation with radar system) considering the same is required.

The other of the required functions is "carrier selection". For minimization of interference and efficient co-existence, LAA nodes select carriers and are operated through movement between the carriers.

The other of the required functions is "transmit power control". The LAA nodes are operated in consideration of maximum transmission power amount of the wireless device of the unlicensed band suggested in the regulation requirements.

The other of the required functions is "RRM measurements including cell identification". To support mobility between secondary cells (SCell) and perform a robust operation in the unlicensed band, radio resource management measurement is required.

Further, as the required functions, there are "AGC setting", "coarse synchronization", "fine frequency/time estimation at least for demodulation", and "channel state information (CSI) measurement including channel and interference". The "automatic gain control (AGC) setting", the "coarse synchronization", the "fine frequency/time estimation at least for demodulation" and the "CSI measurement including channel and interference" are required for RRM measurement and successful reception in the unlicensed band.

Hereinafter, in the unlicensed band (for example, 2 GHz band or 5 GHz band) in which a plurality of wireless devices share and use a channel, when the 3GPP LTE-based cellular mobile communication system is disposed to provide a service, a method for transmitting an uplink signal in consideration of traffic QoS characteristics will be described.

FIG. 1 is a diagram illustrating a method for transmitting an uplink signal in LAA according to an exemplary embodiment of the present invention.

The method for transmitting an uplink signal in consideration of characteristics of an unlicensed band in LAA is performed according to a procedure illustrated in FIG. 1. The overall operation procedure is similar to the uplink transmission suggested in the Rel-12 but the detailed operation procedure is added with new functions to secure the QoS of traffic.

In detail, a terminal and an LAA base station perform a radio bearer (RB) restriction setup (S10). The terminal transmits a scheduling request to the LAA base station (S11). The LAA base station performs scheduling (including UL grant) for the terminal based on the scheduling request (S12). The terminal transmits BSR to the LAA base station (S13). The LAA base station performs the scheduling (including the UL grant) for the terminal based on the BSR (S14). The terminal performs prioritization of logical channels (S15) and transmits an uplink data to the LAA base station (S16). When the uplink transmission fails, the terminal retransmits the uplink data through a fast radio link control retransmission (S17). The fast RLC retransmission process S17 includes an uplink data transmission process S17-1.

Hereinafter, the processes S10 to S17 will be described in detail.

First, the process S10 of setting up a radio bearer (RB) restriction between the terminal and the base station will be described. In detail, an uplink RB is separately configured to be an RB that can be offloaded to an LAA cell (hereinafter, 'off-loadable RB') or an RB that cannot be offloaded thereto (hereinafter, 'non off-loadable RB'). The off-loadable RB is a radio bearer that may transmit signals using uplink radio resources of a licensed band cell and an unlicensed band cell. The non off-loadable RB is a radio bearer that may transmit a signal only using the uplink radio resources of the licensed band cell.

For example, the non off-loadable RB may be used for a transmission of traffic sensitive to a delay. As another example, for the transmission of traffic (for example, best effort traffic) that is not sensitive to the delay, the off-loadable RB and the non off-loadable RB may be used and the uplink transmission through the off-loadable RB and the non off-loadable RB may be made. Generally, a radio bearer that transmits the traffic sensitive to the delay or a radio resource control (RRC) protocol message may be configured to be the non off-loadable RB. Further, a radio bearer that transmits the traffic that is not sensitive to the delay (for example, best-effort traffic) or background traffic may be configured to be the off-loadable RB. A control thereof is set (or configured) by the RB restriction.

The foregoing RB restriction setup may be made by an uplink RB configuration procedure for data transmission, which is made by the RRC procedure.

At the time of the RB configuration for the uplink transmission, the LAA base station configures a radio bearer identifier, a logical channel identifier, and a logical channel group identifier.

The radio bearer identifier configured at the time of the RB configuration maps the logical channel identifier one to one and one logical channel group (LCG) may include a plurality of logical channels. Therefore, a method for allocating a logical channel identifier and an LCG differently configures logical channel groups to which the off-loadable RB and the non off-loadable RB belong. That is, the LAA base station receives a radio resource allocation request for the uplink transmission using the BSR by logical channel group, and therefore separately configures the LCG to which the off-loadable RB belongs and the LCG to which the non off-loadable RB belongs, thereby estimating a radio resource allocation request amount of the LAA cell and a radio resource allocation request amount of the licensed band cell. The terminal may configure the RB and the logical channel group based on the configuration by the LAA base station.

In the LAA, the cell may be classified into the non off-loadable cell and the off-loadable cell depending on a use frequency of a cell included in (belonging to) the CA. The non off-loadable cell is a cell using a licensed band frequency (for example, cell using a licensed band frequency of a primary cell (PCell) and an SCell). The off-loadable cell is a cell (for example, LAA SCell) using an unlicensed band frequency.

The configuration information of the non off-loadable cell and the off-loadable cell may be described in an information element (IE) that is included in an RRC connection reconfiguration message. Here, the IE may be 'SCellToAddMod IE of SCellToAddModList in RRCConnectionReconfiguration'.

At the time of the RB configuration, the following configuration methods (method M100 and M110) may be considered to restrict the radio resources of the cell used for the uplink transmission.

The method M100 is a restriction method by cell type. In detail, at the time of the RB configuration, a cell type that may implement the uplink transmission may be configured. The configuration information may include information on the off-loadable cell or the non off-loadable cell. At the time of the cell configuration, the cell type is indicated. The PCell is a cell using the frequency of the licensed band, and therefore is set as the non off-loadable cell at all times. The SCell operated by the CA is set as the non-off loadable cell when using the frequency of the licensed band and is set as the off-loadable cell when using the frequency of the unlicensed band.

The method M110 is a restriction method by cell. In detail, at the time of the RB configuration, a cell identifier that may implement the uplink transmission may be configured. The configuration information may include a list of cell identifiers. There are a configuration method using a bit map type and a configuration method using a cell number.

In the configuration method using the bit map type, when n cells are set by the CA, bit map information of a length of n bits is transmitted and each bit indicates the cell identifiers. For example, when four SCells are operated by the CA, a bit map of 5 bits (for example, 1 PCell+4 SCells) may indicate configurable cells based on locations of each bit. Here, the configurable cell means a useable cell for the uplink transmission (or RB). For example, when a bit stream for configuring the off-loadable cell among the bit maps of 5 bits is 0110, second and third SCells among four SCells may be recognized as the off-loadable cell.

In the configuration method using a cell number, it is set whether the corresponding cell is the off-loadable cell or the non off-loadable cell when the SCell is set. For example, when four SCells are operated by the CA and two cells may be used for the corresponding RB, off-loadable cell flags for two independent cell identifiers are configured when the corresponding SCell is set (for example, when a data radio bearer (DRB) or a signaling radio bearer (SRB) is configured).

The configuration information for a cell type or a cell restriction by RB may be described in the IE included in the RRC connection reconfiguration message. Here, the IE may be 'SRB-ToAddMod IE of SRB-ToAddModList in RadioResourceConfigDedicated' or 'DRB-ToAddMod IE of DRB-ToAddModList in RadioResourceConfigDedicated'.

Figure 2A:
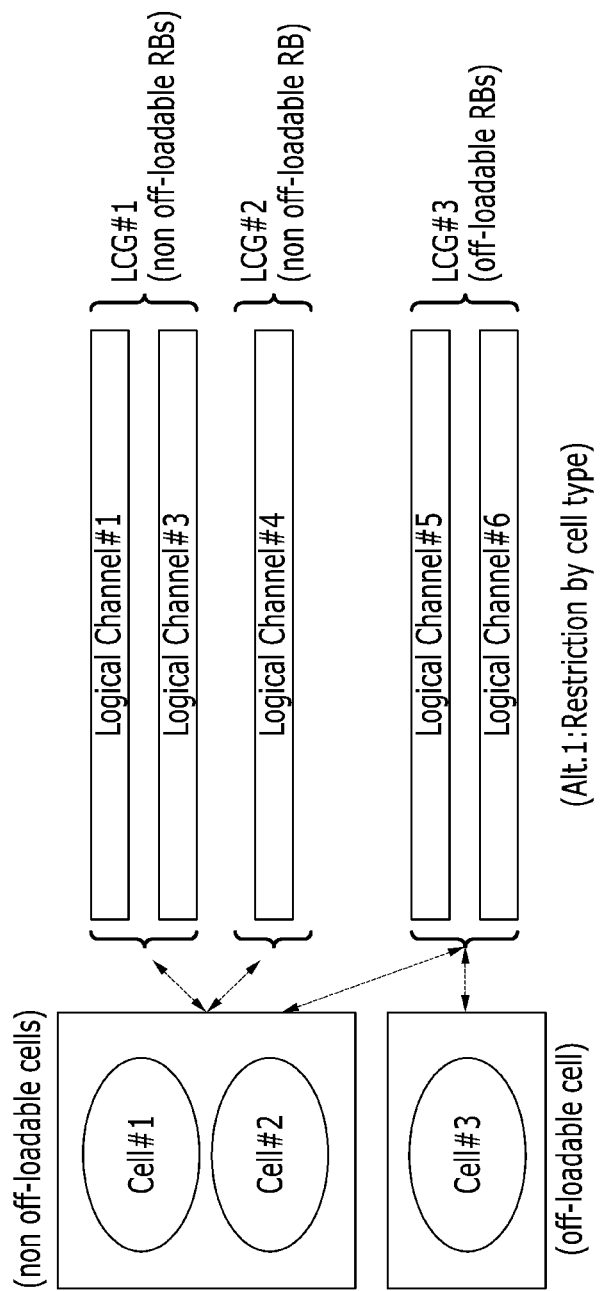
FIGS. 2A and 2B are diagrams illustrating a method for limiting a radio resource for an uplink transmission when a radio bearer is configured, according to an exemplary embodiment of the present invention.
Figure 2B:
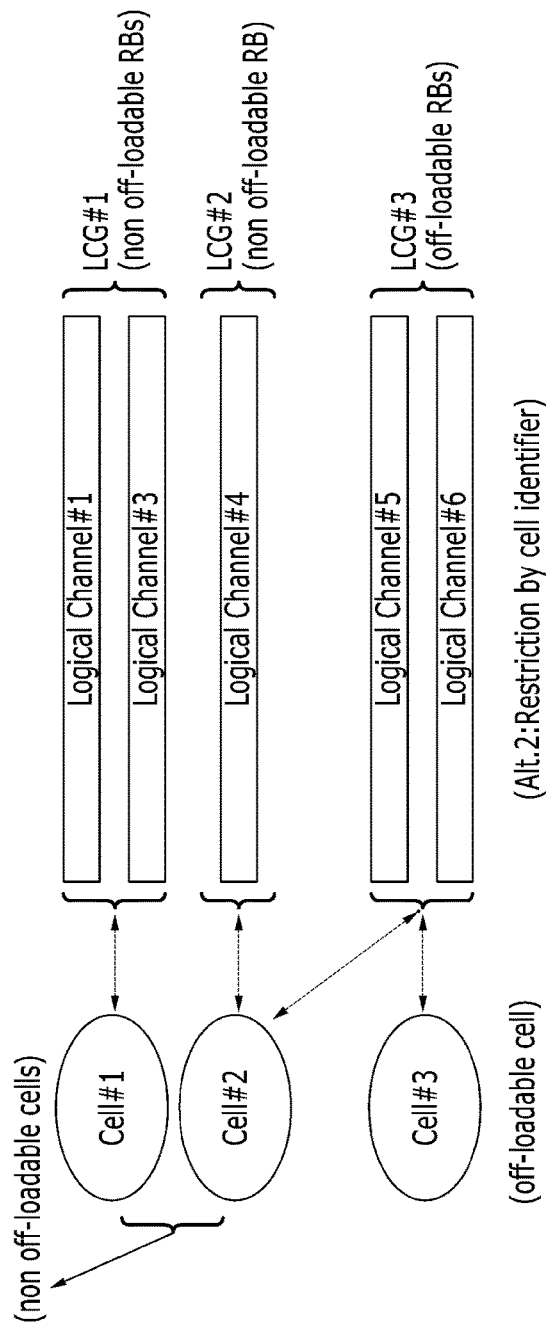

FIGS. 2A and 2B are diagrams illustrating a method for limiting a radio resource for the uplink transmission when a radio bearer is configured, according to an exemplary embodiment of the present invention. FIG. 2A illustrates the method M100 and FIG. 2B illustrates the method M110.

FIGS. 2A and 2B illustrate a case in which LCG#1 includes logical channel #1 and logical channel #3 and corresponds to the non off-loadable RBs, LCG#2 includes logical channel #4 and corresponds to the non off-loadable RB, and LCG#2 includes logical channel #5 and logical channel #6 and corresponds to the off-loadable RBs.

When the radio resource is restricted by cell type, as illustrated in FIG. 2A, the logical channels (logical channel#1, logical channel#3, logical channel#4) included in the LCG#1 and the LCG#2 perform an uplink transmission using radio resources of Cell#1 and Cell#2 that are the non off-loadable cell. Further, the logical channels (logical channel#5, logical channel#6) included in the LCG#3 perform the uplink transmission using a radio resource of Cell#3 that is the off-loadable cell and the radio resources of the Cell#1 and Cell#2 that are the non off-loadable cell.

On the other hand, when the radio resource is restricted by cell identifier, as illustrated in FIG. 2B, the logical channels (logical channel#1, logical channel#3) included in the LCG#1 perform the uplink transmission using the radio resource of Cell#1 that is the non off-loadable cell. Further, the logical channel (logical channel#2) included in the LCG#2 performs the uplink transmission using the radio resource of the Cell#2 that is the non off-loadable cell. However, like the exemplary embodiment of FIG. 2A, the logical channels (logical channel#5, logical channel#6) included in the LCG#3 perform the uplink transmission using the radio resource of Cell#3 that is the off-loadable cell and the radio resources of the Cell#1 and Cell#2 that are the non off-loadable cell.

Consequently, when the radio resource is restricted by cell type, the radio resource restriction is performed by cell group having the cell type (non off-loadable cell type, off-loadable cell type). For example, according to the exemplary embodiment of FIG. 2A, the radio resource restriction is performed on the cell groups (Cell#1, Cell#2) belonging to the non off-loadable cell type and the cell group (Cell#3) belonging to the off-loadable cell type, respectively.

When the radio resource is restricted for each cell, the radio resource restriction is performed for each cell. For example, according to the exemplary embodiment of FIG. 2B, the radio resource restriction is performed on the Cell#1 that is the non off-loadable cell, the Cell#2 that is the non off-loadable cell, and the Cell#3 that is the off-loadable cell, respectively.

Meanwhile, transmitting data using the LAA SCell may obtain a gain in terms of the radio resource use efficiency of the unlicensed band but the case in which the requirements (QoS) of a service are not satisfied due to the delay caused by the uplink LBT may occur. Hereinafter, therefore, when there are no UL grants allocated to the non off-loadable cells but there are the UL grants allocated to the off-loadable cells, methods (method M200 and method M210) for restrictively transmitting MAC CE to an uplink using an off-loadable cell will be described.

The method M200 is a method for performing transmission using an off-loadable cell and then performing retransmission using a non off-loadable cell. The method M200 will be described in detail with reference to FIG. 3.

Figure 3:
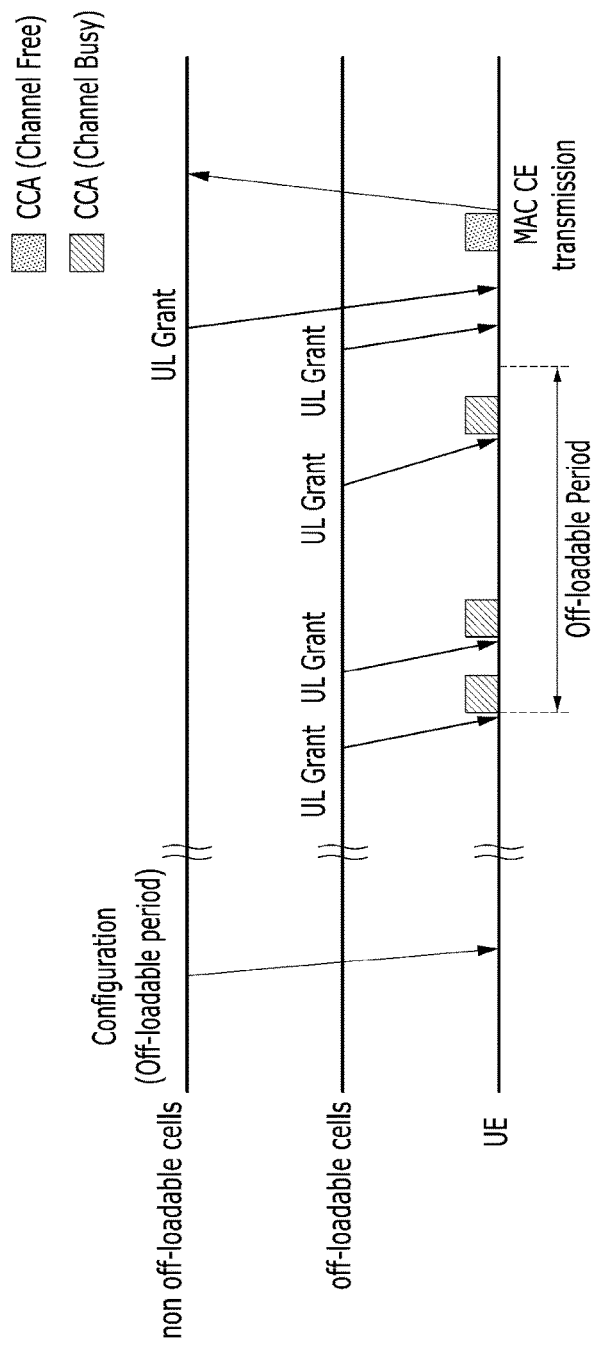
FIG. 3 is a diagram illustrating a method for transmitting an MAC control element (CE) according to an exemplary embodiment of the present invention.

FIG. 3 is a diagram illustrating a method for transmitting an MAC control element (CE) according to an exemplary embodiment of the present invention. FIG. 3 illustrates an exemplary embodiment of the method (method M200) for performing transmission using an off-loadable cell and then performing retransmission using a non off-loadable cell. The MAC CE may be configured based on the foregoing LCG (for example, LCG#1, LCG#2, LCG#3).

In detail, in the method M200, the wireless device (for example, terminal) tries to transmit the MAC CE using the UL grants allocated to the off-loadable cells and when the corresponding MAC CE is not transmitted by the uplink LBT, may perform the retransmission by the UL grants allocated to the non off-loadable cells.

For this purpose, the LAA base station sets, in the terminal, a period (hereinafter, 'off-loadable period') where the uplink transmission may be tried by the UL grants allocated to the off-loadable cells at the time of the RB configuration for the terminal.

The terminal performs the transmission of the MAC CE through the off-loadable cell (UL grants allocated to the off-loadable cells) for the set off-loadable period.

If the transmission of the MAC CE through the off-loadable cell for the set off-loadable period fails (for example, when the terminal determines that the corresponding channel is in a busy state based on the CCA for the channel), the terminal transmits the corresponding MAC CE through the uplink grants (UL grants allocated to the non off-loadable cells) of the licensed band cell received later. For example, the terminal may transmit the MAC CE through the non off-loadable cell when it is determined that the corresponding channel is in an idle state (or free state) based on the CCA for the channel.

When the method M200 is used, the LAA base station needs to set the off-loadable period that is a period where the terminal tries to perform the transmission of the MAC CE through the off-loadable cell, by a signal procedure.

The method M210 is a method for transmitting MAC CE in consideration of a channel congestion threshold value.

In the method M210, the terminal measures the channel congestion used in the off-loadable cell and compares the channel congestion with a set threshold value. The terminal transmits the MAC CE using the UL grants allocated to the off-loadable cells only when the channel congestion is lower than the threshold value. When the channel congestion is lower than the threshold value, the following operation procedure of the terminal is the same as the method M200. That is, the terminal tries the transmission of the MAC CE for a predetermined time (for example, off-loadable period) using the UL grants allocated to the off-loadable cells. If the corresponding MAC CE is not transmitted by the uplink LBT, the terminal tries the retransmission of the MAC CE through the UL grant of the non off-loadable cell received later.

The channel congestion $CH_{congestion}$ of the off-loadable cell measured by the terminal may be defined as a ratio of an uplink transmission frequency (the number of uplink transmission successes) to a UL grant frequency (the number of uplink grants) allocated within a specific observation window and may be calculated as the following Equation 1.

$$CH_{congestion} = \text{number of UL transmission/number of UL grant} \quad \text{(Equation 1)}$$

In the above Equation 1, the number of the UL grants may represent the number of the UL grants allocated to the off-loadable cells within the specific observation window and the uplink transmission frequency (the number of uplink transmission successes) may represent the number of the uplink transmissions preformed through the off-loadable cells within the specific observation window.

As the method for using an observation window, there is a sliding window method (method M211) or a specific observation window method (method M212). The sliding window method (method M211) and the specific observation window method (method M212) will be described in detail with reference to FIGS. 4A and 4B.

Figure 4A:
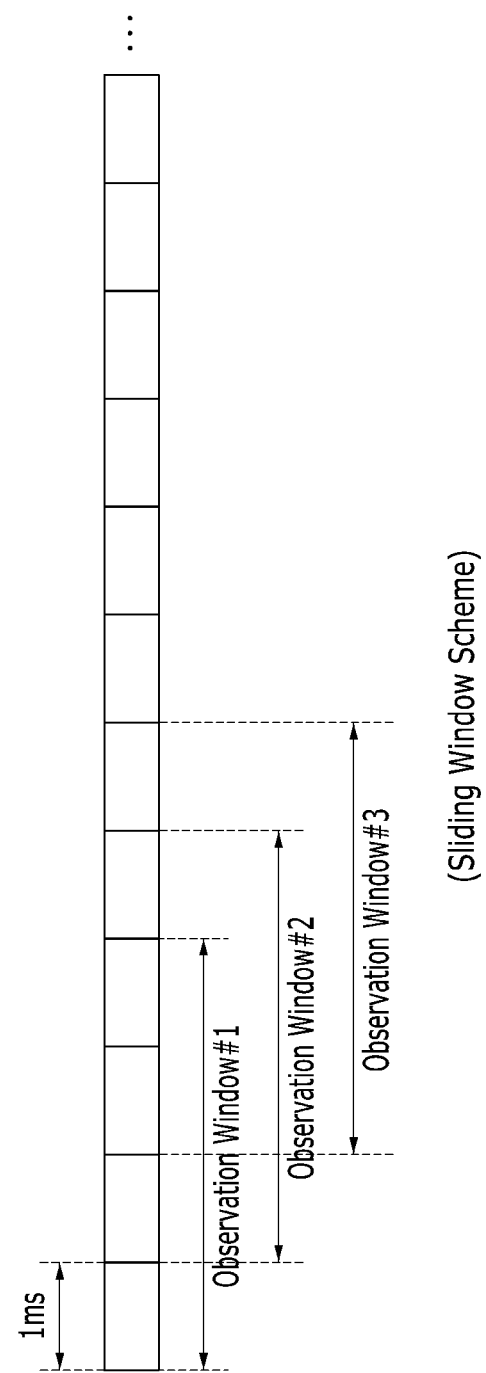
FIGS. 4A and 4B are diagrams illustrating a method for using an observation window for channel congestion measurement, according to an exemplary embodiment of the present invention.
Figure 4B:
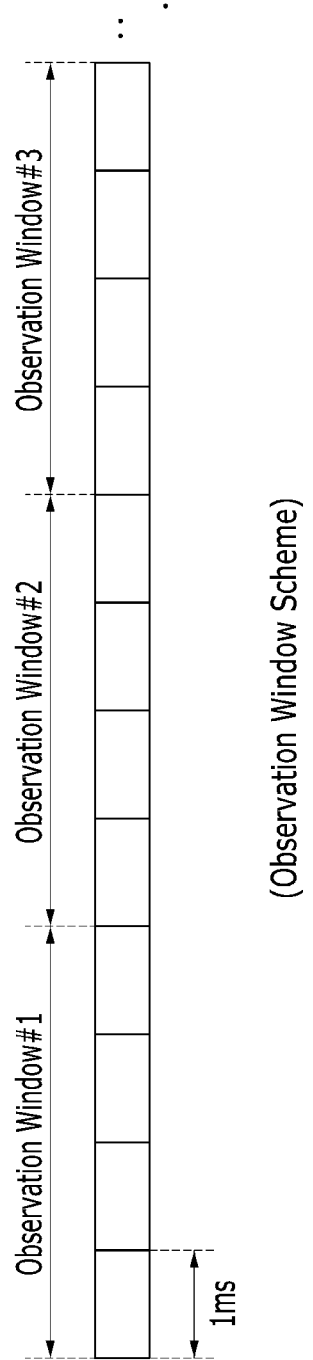

FIGS. 4A and 4B are diagrams illustrating a method for using an observation window for channel congestion measurement, according to an exemplary embodiment of the present invention. In detail, FIG. 4A illustrates the sliding window method (method M211) and FIG. 4B illustrates the specific observation window method (method M212).

The sliding window method (method M211) is a method for measuring a channel congestion while shifting the observation window by observation granularity. For example, as illustrated in FIG. 4A, when the observation window is 4 ms and the observation granularity is 1 ms, the terminal calculates the channel congestion that is a ratio between the UL grant received per 1 ms and an UL transmission up to 4 ms early that is the observation window (observation window#1). After the observation window (observation window#1, 4 ms), the terminal measures the channel congestion while moving the observation window (for example, moving to the right) by 1 ms. That is, the terminal measures the channel congestion within an observation window (observation window#2) located by shifting an observation window (observation window#1) by 1 ms and measures the channel congestion within an observation window (observation window#3) located by shifting an observation window (observation window#2) by 1 ms.

On the other hand, the observation window method (method M212) is a method for measuring a channel congestion within a set observation window. For example, as illustrated in FIG. 4B, when the observation window is 4 ms, the terminal newly sets the observation windows (observation window#1, observation window#2, observation window#3, . . . ) per 4 ms and initializes the channel congestion previously measured and then measures the channel congestion within each observation window. The observation windows (observation window#1, observation window#2, observation window#3, . . . ) are set not to overlap each other. That is, the terminal initializes the channel congestion measured within the previous observation window (for example, observation window#1) and measures the channel congestion within the next observation window (for example, observation window#2).

When the method M210 is used, the LAA base station needs to set the off-loadable period at which the terminal performs the transmission try of the MAC CE through the off-loadable cell, the observation window, the observation granularity, and the channel congestion threshold value, by the signal procedure.

Meanwhile, the configuration information for transmitting the MAC CE through the foregoing off-loadable cell may be described in the IE included in the RRC connection reconfiguration message. Here, the IE may be 'MAC-MainConfig IE in RadioResourceConfigDedicated'.

Next, the scheduling request (SR) process S11 will be described.

The SR is a signal that requests an uplink radio resource for new transmission. The signal may be transmitted through the PCell or a physical uplink control channel (PUCCH) SCell.

Next, the scheduling (UL grant) process S12 will be described.

The LAA base station allocates the uplink radio resource to the SR of the terminal transmitted in the process S11. In the process S12, the BSR is transmitted through the allocated uplink radio resource. In the process S12, the LAA base station may allocate the radio resources of the licensed band cell or the LAA SCell according to the method for transmitting the MAC CE. In detail, the following methods (method M300, method M310) may be considered.

The method M300 is a scheduling method using a non off-loadable cell (licensed band cell). The method M310 is a scheduling method using an off-loadable cell (LAA SCell). The method M300 may have lower latency than the method M310, but has a drawback in that the use efficiency of the unlicensed band radio resource deteriorates. The method M310 has a merit in that the use efficiency of the unlicensed band radio resource is increased but has the possibility that additional latency may occur due to the LBT.

Considering the merits and drawbacks of the method M300 and the method M310, a size of MAC PDU required to transmit the BSR is up to 5 bytes (=MAC sub header+long BSR CE), which does not greatly affect the use of the radio resource, and therefore it is preferable for the LAA base station to perform scheduling using the method M300. However, the detailed scheduling method is determined by a scheduler of the LAA base station.

When the allocation of the uplink radio resource (for example, radio resource for the BSR) is performed by the method M310 and the methods (for example, methods M200 and M210) for restrictively transmitting the MAC CE using an off-loadable cell is established, the transmission procedure of the MAC CE suggested in the foregoing process S10 may be used.

Next, the BSR transmission process S13 will be described.

The process S13 is a procedure of reporting, by the terminal, uplink buffer information (for example, state of a buffer for the uplink transmission) to an LAA base station. For this purpose, the MAC CE configured based on the LCG may be used. The transmission of the BSR uses the scheduling suggested in the process S12. For example, for the BSR, the terminal may transmit the MAC CE configured based on at least one LCG to the LAA base station using the radio resource allocated in the process S12.

A size of the buffer included in the BSR means all data amount included in an RLC and packet data compression protocol (PDCP) buffer.

Next, the scheduling (UL grant) process S14 will be described.

The LAA base station allocates the uplink radio resource for data transmission based on the BSR received from the terminal. In detail, the LAA base station may allocate the uplink radio resource for the non off-loadable cell and the off-loadable cell based on the BSR by LCG received in the process S13. For example, when the LCG (for example, LCG#1) includes logical channels for signaling radio bearer (SBR) or real-time traffic, the base station may allocate the uplink radio resources of the non off-loadable cells for the corresponding LCG (for example, LCG#1). As another example, when the LCG (for example, LCG#2) includes logical channels for non real-time traffic, the base station may first allocate the uplink radio resources of the off-loadable cells for the corresponding LCG (for example, LCG#2). However, the detailed scheduling method is determined by a scheduler of the LAA base station.

Next, the prioritization process S15 will be described.

In the process S14, the uplink radio resource allocation is formed in a terminal unit based on the BSR received in the process S13. The terminal to which the uplink radio resource is allocated performs the prioritization procedure by logical channel and then generates the MAC PDU for an uplink transmission and transmits the generated MAC PDU to the LAA base station through an uplink shared channel (UL-SCH). In the LAA, the prioritization is performed based on logical channel prioritization (LCP) parameters received in the process S10. That is, the terminal performs the prioritization procedure (first LCP method or second LCP method) on the uplink radio resource allocation information received in the UL grant of the process S14 based on the LCP parameters set by logical channel. Here, the first LCP method is a method for determining cell types for logical channels and performing an LCP procedure by cell type. The second LCP method is a method for performing an LCP procedure on the logical channels.

In detail, the first LCP method is for the case in which the cell types are set for each logical channel, and the terminal independently performs the prioritization on the UL grant included in (belonging to) the cell types (for example, non off-loadable cell type and off-loadable cell type) set by logical channel. The UL grant included in (belonging to) a list of the non off-loadable cells or a list of the off-loadable cells may be individually used and integrally used. This is a terminal implementation issue.

The second LCP method is for the case in which cell identifiers are set for each logical channel and the terminal independently performs the prioritization on the UL grant included in (belonging to) a list of the cell identifiers set by logical channel. The UL grant included in (belonging to) a list of the non off-loadable cells or a list of the off-loadable cells may be individually used and integrally used. This is a terminal implementation issue.

Meanwhile, the uplink radio resource allocation according to the request of the BSR may consider Cases (Case 1, Case 2, and Case 3) defined in the following Table 1 (example of the UL grant in the LAA).

TABLE 1

| | UL grant of Non off-loadable cell | UL grant of Off-loadable cell | Remark |
| --- | --- | --- | --- |
| Case1 | X | | Case in which only UL grant of Non off-loadable cell (licensed band cell) is received |
| Case2 | | X | Case in which only UL grant of Off-loadable cell (LAA cell) is received |
| Case3 | X | X | Case in which UL grant of Non off-loadable cell (licensed band cell) and UL grant of Off-loadable cell (LAA cell) are simultaneously received |

In Case 1, the terminal performs the LCP operation according to the following procedure. The terminal performs the LCP operation on the UL grants allocated to all the non off-loadable cells. In detail, the terminal sequentially performs the following processes S20, S21, and S22 on the logical channel configured as the non off-loadable cell (cell type).

In process S20, the terminal allocates the uplink radio resources corresponding to a priority bit rate (PBR) to all logical channels j having a value of $B_j$ that is equal to or more than 0 in descending priority. Here, $B_j$ represents a bucket parameter (or current bucket content) for the logical channel j.

In process S21, the terminal reduces a size of an MAC service data unit (MAC SDU) of the logical channel j from the $B_j$.

In process S22, the terminal performs the processes S20 and S21 on all the logical channels j in descending priority and then when radio resources for the uplink transmission remain, performs at least one of the following processes S22-1, S22-2, and S22-3 on the remaining uplink radio resources.

In process S22-1, the terminal allocates the remaining uplink radio resources to the logical channels j in priority (descending priority).

In process S22-2, the terminal performs at least one of the following processes S22-2a, S22-2b, and S22-2c on the logical channel configured as the off-loadable cell (cell type).

In process S22-2a, the terminal allocates the uplink radio resources corresponding to PBR to all logical channels j having a value of $B_j$ that is equal to or more than 0 in descending priority.

In process S22-2b, the terminal reduces a size of the MAC SDU of the logical channels j from the $B_j$.

In process S22-2c, the terminal performs the processes S22-2a and S22-2b on all the logical channels j in descending priority and then when uplink radio resources remain, performs at least one of the following processes S22-2c-1 and S22-2c-2 on the remaining uplink radio resources.

In process S22-2c-1, the terminal allocates the radio resources for the uplink transmission to the logical channels j in priority (descending priority).

In process S22-2c-2, the terminal does not use the remaining uplink radio resources.

In process S22-3, the terminal does not use the remaining uplink radio resources.

Meanwhile, when the terminal performs the LCP procedure for the foregoing Case 1, the MAC of the terminal may prioritize the transmission of the MAC CE to transmit the MAC CE.

In Case 2, the terminal performs the LCP operation according to the following procedure.

The terminal performs the LCP operation on the UL grants allocated to all the off-loadable cells. In detail, the terminal may sequentially perform the following processes S30, S31, and S32 on the logical channel configured as the off-loadable cell.

In process S30, the terminal performs the process S20 of the Case 1.

In process S31, the terminal performs the process S21 of the Case 1.

In process S32, the terminal performs the processes S30 and S31 on all the logical channels j in descending priority and then when uplink radio resources remain, performs at least one of the following processes S32-1 and S32-2 on the remaining uplink radio resources.

In process S32-1, the terminal performs the process S22-1 of the Case 1.

In process S32-2, the terminal performs the process S22-3 of the Case 1.

Meanwhile, when the terminal performs the LCP procedure for the foregoing Case 2, the MAC of the terminal considers the methods (for example, method M200 and method M210) for restrictively transmitting MAC CE to an uplink using an off-loadable cell that is a method suggested in the process S10 and may prioritize the transmission of the MAC CE to transmit the MAC CE.

In Case 3, the terminal performs the LCP operation according to the following procedure.

The terminal performs the LCP operation on the UL grants allocated to all the off-loadable cells. In detail, the terminal may sequentially perform the following processes S30, S31, and S32 suggested in the Case 2 on the logical channel configured as the off-loadable cell.

The terminal performs the LCP operation on the UL grants allocated to all the non off-loadable cells. In detail, the terminal may perform the following processes S20, S21, and S22 proposed in the Case 1 on the logical channel configured as the non off-loadable cell.

Meanwhile, when the terminal performs the LCP procedure for the foregoing Case 3, the MAC of the terminal may prioritize the UL grants allocated to the non off-loadable cells and use these UL grants to transmit the MAC CE. That is, the MAC of the terminal may use the UL grants allocated to the non off-loadable cells prior to the UL grants allocated to the off-loadable cells to transmit the MAC CE.

When the terminal uses all the UL grants allocated to the non off-loadable cells but the MAC CE that the terminal will transmit remains, the MAC of the terminal considers the methods (for example, method M200 and method M210) for restrictively transmitting the MAC CE to an uplink using off-loadable cells that are the methods suggested in the process S10 and may prioritize the transmission of the MAC CE to transmit the MAC CE.

Next, the uplink data transmission process S16 will be described.

The MAC PDU generated by the prioritization process S15 is transmitted to the physical layer, which is transmitted to the uplink through the UL-SCH.

Next, the fast RLC retransmission process S17 will be described.

The fast RLC retransmission process S17 is an optional procedure performed when the terminal performs the uplink data transmission process S16 using the off-loadable cell but fails to perform the uplink transmission. When the uplink transmission fails, the terminal may overcome an error based on a hybrid automatic request (HARQ) retransmission and an RLC retransmission. However, when the terminal performs the process S17, the characteristics of the off-loadable cell needs to be considered.

Generally, the RLC retransmission is performed when an RLC status report is received from the RLC of the other side, but in the LAA performing the discontinuous transmission by the LBT, according to the form of retransmission method, the delay may be long. Therefore, a method for reducing a delay of an RLC retransmission of an off-loadable cell is required and the following methods (method M400 and method 410) may be considered.

The method M400 is a method for using an HARQ parameter.

In the Rel-12 MAC, the number of HARQ retransmissions is defined based on maxHARQ-Tx included in MAC-Main Config IE and the parameters are commonly applied to all cells included in (belonging to) the CA. However, as described above, the characteristics of the off-loadable cell and the non off-loadable cell are different, and therefore there is a need to independently set the corresponding parameters to each cell in consideration of the characteristics.

FIG. 5 is a diagram illustrating a method for setting (configuring) an independent maximum HARQ transmission frequency (the maximum number of HARQ transmissions) for an off-loadable cell and a non off-loadable cell, respectively, according to an exemplary embodiment of the present invention. For example, as illustrated in FIG. 5, a parameter of the maximum number of HARQ retransmissions for the non off-loadable cell (cell type) may be set (configured) as maxHARQ-Tx and a parameter of the maximum number of HARQ retransmissions for the off-loadable cell (cell type) may be set as maxHARQ-Tx-LAA.

As a method for performing, by a terminal, an uplink transmission and then determining whether the corresponding uplink transmission succeeds, there are a method for using explicit signaling and a method for using a transfer of scheduling information for uplink retransmission.

The method for using explicit signaling is a method for transmitting, by a base station, a physical HARQ indicator channel (PHICH) that is a physical layer through a downlink to transmit whether an uplink transmission succeeds to a terminal.

The method for using a transfer of scheduling information for an uplink retransmission is a method for transmitting, by a base station, scheduling information indicating the corresponding uplink retransmission to a terminal when the uplink transmission error occurs.

The terminal may recognize the uplink transmission error based on the two methods (the method for using explicit signaling and the method for using a transfer of scheduling information for uplink retransmission) and perform the retransmission in consideration of the foregoing parameters (for example, maxHARQ-Tx, maxHARQ-Tx-LAA).

The method (method M400) for reducing a delay of an RLC retransmission of an off-loadable cell using an HARQ parameter may be performed by the following processes S40, S41, and S42.

In the process S40, the terminal performs the HARQ retransmission. In detail, when the error occurs after the uplink transmission, the terminal may perform the uplink retransmission using the off-loadable cell as many as the configured maximum number of HARQ retransmissions (maxHARQ-Tx-LAA).

In the process S41, the terminal requests the uplink radio resources of the non off-loadable cells (cell type) and is allocated the radio resources. In detail, when the number of uplink retransmission tries reaches the configured maximum number of HARQ retransmissions (for example, max-HARQ-Tx-LAA), the terminal may be allocated the uplink radio resources of the non off-loadable cells based on an SR procedure and a BSR procedure or allocated the uplink radio resources of the non off-loadable cells depending on the recognition and determination of the base station. By this, the terminal may secure the radio resources for the RLC retransmission.

In the process S42, the terminal retransmits the RLC PDU depending on the indication of the MAC. In detail, the terminal may perform the RLC retransmission based on the uplink (uplink radio resource) of the non off-loadable cell set in the process S41. The process S42 may be performed based on the following two methods (method M401 and method M402).

The method M401 is a method for sharing, by an RLC and an MAC of a terminal, a sequence number. In detail, when transmitting the RLC PDU for the uplink transmission to the MAC, the RLC may transmit the sequence number of the corresponding RLC PDU to the MAC. Next, when the number of uplink retransmission tries reaches the maximum number of HARQ retransmissions (for example, max-HARQ-Tx-LAA) and the retransmission of the RLC level is required, the MAC may request and receive the RLC PDU corresponding to the corresponding sequence number (sequence number of the RLD PDU to be retransmitted) to the RLC and retransmit the received RLC PDU.

The method M402 is a method for sharing, by an RLC and an MAC of a terminal, an HARQ process identifier. In detail, when requesting the RLC PDU to the RLC, the MAC may transmit the HARQ process identifier to be used for the corresponding transmission to the RLC. Next, when the number of uplink retransmission tries reaches the maximum number of HARQ retransmissions (for example, max-HARQ-Tx-LAA) and the retransmission of the RLC level is required, the MAC may transmit the corresponding HARQ process identifier (HARQ process identifier to be used for retransmission) to the RLC and the RLC may retransmit the RLC PDU corresponding to the received HARQ process identifier.

The method M410 is a method for using an RLC parameter. In detail, the method 410 is a method for independently setting, in a non off-loadable RB and an off-loadable RB, respectively, maxRetxThreshold that is a parameter of the maximum number of retransmissions used for retransmission in the RLC. By this, the fast RLC retransmission may be performed. The terminal may perform the RLC retransmission based on the RLC parameter (maxRetxThreshold) independently set in the non off-loadable RB and the off-loadable RB, respectively.

For example, the RLC parameter (maxRetxThreshold) for the off-loadable RB may be set to be smaller than the RLC parameter (maxRetxThreshold) for the non off-loadable RB, such that the retransmission to the non off-loadable cell may be performed based on the transmission/reception of the RLC status report. In this case, an MAC scheduler may allocate the radio resources for the uplink transmission of the non off-loadable cell or the off-loadable cell based on the scheduling according to the RLC transmission form (for example, initial transmission or retransmission).

Figure 6:
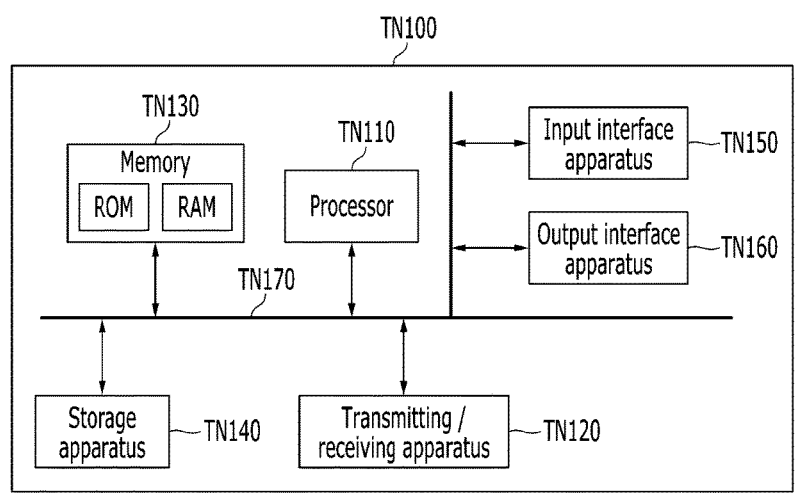
FIG. 6 is a diagram illustrating a wireless device according to an exemplary embodiment of the present invention.

FIG. 6 is a diagram illustrating a wireless device according to an exemplary embodiment of the present invention. A wireless device TN100 may be the base station or the terminal that are described in the present specification.

In the exemplary embodiment of FIG. 6, the wireless device TN100 may include at least one processor TN110, a transmitting/receiving apparatus (device) TN120 connected to a network to perform communication, and a memory TN130. Further, the wireless device TN100 may further include a storage apparatus (device) TN140, an input interface apparatus (device) TN150, an output interface apparatus (device) 160, or the like. Components included in the wireless device TN100 may be connected to each other by a bus TN170 to communicate with each other.

The processor TN110 may run a program command that is stored in at least one of the memory TN130 and the storage apparatus TN140. The processor TN110 may mean a central processing unit (CPU), a graphics processing unit (GPU), or an exclusive processor that performs methods according to exemplary embodiments of the present invention. The processor TN110 may be configured to implement the procedures, the functions, and the methods described with reference to the exemplary embodiment of the present invention. The processor TN110 may control each of the components of the wireless device TN100.

The memory TN130 and the storage apparatus TN140 may each store various information associated with the operation of the processor TN110. The memory TN130 and the storage apparatus TN140 may each be configured of at least one of a volatile storage medium and a non-volatile storage medium. For example, the memory TN130 may be configured of at least one of a read only memory (ROM) and a random access memory (RAM).

The transmitting/receiving apparatus TN120 may transmit or receive a wired signal or a wireless signal. Further, the wireless device TN100 may have a single antenna or a multiple antenna.

According to the exemplary embodiment of the present invention, in the LAA in which the cell of the licensed band frequency and the cell of the unlicensed band frequency are operated by the CA, at the time of the uplink traffic transmission, the QoS of the service may be secured and the system performance may be improved.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting, by a terminal, an uplink signal using a first cell type representing a cell using a licensed band frequency and a second cell type representing a cell using an unlicensed band frequency, the method comprising:

configuring at least one first radio bearer (RB) being able to use a radio resource for the first cell type and a radio resource for the second cell type for an uplink transmission;

configuring at least one second RB being able to use a radio resource for the first cell type for an uplink transmission;

including at least one first logical channel corresponding to the at least one first RB in a first logical channel group; and including at least one second logical channel corresponding to the at least one second RB in a second logical channel group.

2. The method of claim 1, wherein:

a secondary cell (SCell) is configured as one of the first cell type and the second cell type based on a frequency used by the SCell operated using carrier aggregation (CA) among the licensed band frequency and the unlicensed band frequency.

3. The method of claim 1, wherein the at least one second logical channel uses a radio resource of the first cell type of a cell group for an uplink transmission, and the at least one first logical channel uses a radio resource of the first cell type of a cell group and a radio resource of the second cell type of a cell group for an uplink transmission.

4. The method of claim 1, wherein:

the at least one second logical channel uses a radio resource of the first cell type of a cell corresponding to the second logical channel group for an uplink transmission, and the at least one first logical channel uses radio resources of the first cell type of a cell and the second cell type of a cell corresponding to the first logical channel group for an uplink transmission.

5. The method of claim 1, further comprising:

transmitting a medium access control (MAC) control element (CE) based on at least one of the first logical channel group and the second logical channel group using a first uplink grant allocated to the second cell type of a cell; and retransmitting the MAC CE using a second uplink grant allocated to the first cell type of a cell when the transmission of the MAC CE fails.

6. The method of claim 5, wherein:

transmitting the MAC CE includes:

receiving configuration of a first period for the transmission of the MAC CE from a base station; and performing the transmission of the MAC CE using the first uplink grant for the first period, and retransmitting the MAC CE includes:

performing the retransmission of the MAC CE using the second uplink grant when the transmission of the MAC CE performed for the first period fails.

7. The method of claim 1, further comprising:

measuring a channel congestion used in the second cell type of a cell; and transmitting a medium access control (MAC) control element (CE) based on at least one of the first logical channel group and the second logical channel group using a first uplink grant allocated to the second cell type of a cell when the channel congestion is smaller than a threshold value.

8. The method of claim 7, wherein:

the measuring of the channel congestion includes:

calculating the channel congestion that is a ratio of the number of uplink transmission successes to the number of uplink grants allocated within an observation window for measurement of the channel congestion.

9. The method of claim 7, wherein:

the measuring of the channel congestion includes:

calculating the channel congestion within an observation window configured for measurement of the channel congestion;

shifting the observation window by a predetermined value smaller than a length of the observation window; and calculating the channel congestion within the shifted observation window.

10. The method of claim 7, wherein:

the measuring of the channel congestion includes:

calculating the channel congestion within a first observation window configured for measurement of the channel congestion; and calculating the channel congestion within a second observation window configured not to overlap the first observation window.

11. The method of claim 1, further comprising:

receiving allocation of a first radio resource from a base station using at least one of the first cell type of a cell and the second cell type of a cell; and transmitting a medium access control (MAC) control element (CE) based on at least one of the first channel group and the second channel group to the base station through the first radio resource to report a buffer status for an uplink transmission to the base station.

12. The method of claim 1, further comprising:

receiving allocation of a radio resource of the first cell type of a cell for the second logical channel group, when the second logical channel group includes a logical channel for a signaling radio bearer (SRB) or real-time traffic; and receiving allocation of a radio resource of the second cell type of a cell for the first logical channel group, when the first logical channel group includes a logical channel for non real-time traffic.

13. A method for transmitting, by a terminal, an uplink signal using a first cell type representing a cell using a licensed band frequency and a second cell type representing a cell using an unlicensed band frequency, the method comprising:

receiving allocation of a first uplink radio resource for an uplink transmission from a base station;

allocating a radio resource as much as a priority bit rate (PBR) among the first uplink radio resource to at least one first logical channel, respectively, corresponding to the first cell type in descending priority, when a first uplink grant among the first uplink grant of the first cell type and a second uplink grant of the second cell type is received; and when the first uplink radio resource remains, allocating a radio resource as much as the PRB among the remaining uplink radio resources to at least one second logical channel, respectively, corresponding to the second cell type in descending priority.

14. The method of claim 13, wherein:

the allocating of the radio resource to the at least one second logical channel, respectively includes:

when the remaining radio resources other than the radio resource allocated to the at least one second logical channel among the remaining uplink radio resources are present, additionally allocating the remaining radio resources to the at least one second logical channel in descending priority.

15. The method of claim 13, further comprising:

allocating a radio resource as much as the PBR among the first uplink radio resource to the at least one second logical channel, respectively, in descending priority when the second uplink grant among the first uplink grant and the second uplink grant is received; and when the first uplink radio resource remains, additionally allocating the remaining radio resources to the at least one second logical channel in descending priority.

16. The method of claim 13, further comprising:

using the first uplink grant prior to the second uplink grant to transmit a medium access control (MAC) control element (CE), when the first uplink grant and the second uplink grant are received.

17. A method for transmitting, by a terminal, an uplink signal using a first cell type representing a cell using a licensed band frequency and a second cell type representing a cell using an unlicensed band frequency, the method comprising:

transmitting an uplink transmission using a cell of the second cell type;

determining whether the uplink transmission succeeds; and performing an uplink retransmission by retransmitting the uplink transmission using a cell of the second cell type based on at least one of a first hybrid automatic request (HARQ) parameter and a second HARQ parameter independently configured for the first cell type and the second cell type and representing the maximum number of HARQ retransmissions, when the uplink transmission fails.

18. The method of claim 17, wherein:

the determining includes:

recognizing that the uplink transmission fails based on at least one of a physical HARQ indicator channel (PHICH) transmitted by a base station and scheduling information transmitted by the base station and representing the uplink retransmission.

19. The method of claim 17, further comprising:

receiving allocation of a radio resource of the first cell type for a radio link control (RLC) retransmission from a base station when the number of uplink retransmission tries corresponds to the second HARQ parameter; and retransmitting a RLC packet data unit (PDU) through a radio resource for the RLC retransmission using at least one of a sequence number of the RLC PDU to be retransmitted at an RLC level and an HARQ process identifier used for the retransmission of the RLC PDU.

20. The method of claim 17, further comprising:

when the uplink transmission fails, performing the uplink retransmission using a radio link control (RLC) retransmission based on at least one of a first RLC parameter and a second RLC parameter, which are independently configured for a first radio bearer (RB) being able to use a radio resource of the first cell type of and a radio resource of the second cell type and a second RB being able to use a radio resource for the first cell type and which represent the maximum number of retransmissions.

* * * * *